United States Patent [19]

Bromley

[11] Patent Number: 5,247,613
[45] Date of Patent: Sep. 21, 1993

[54] MASSIVELY PARALLEL PROCESSOR INCLUDING TRANSPOSE ARRANGEMENT FOR SERIALLY TRANSMITTING BITS OF DATA WORDS STORED IN PARALLEL

[75] Inventor: H. Mark Bromley, Andover, Mass.

[73] Assignee: Thinking Machines Corporation, Cambridge, Mass.

[21] Appl. No.: 520,701

[22] Filed: May 8, 1990

[51] Int. Cl.$^5$ ............................................. G06F 13/14
[52] U.S. Cl. .................................. 395/200; 364/DIG. 1;
364/229; 364/229.2; 364/242.5; 364/260.3;
364/932.8; 364/940.62; 364/947.6; 364/947.7;
364/951.4
[58] Field of Search ............................... 395/800, 200

[56] References Cited

U.S. PATENT DOCUMENTS

| | | | |
|---|---|---|---|
| 4,031,512 | 6/1977 | Faber | 340/825.05 |
| 4,174,514 | 11/1979 | Sternberg | 382/49 |
| 4,314,349 | 2/1982 | Batcher | 364/716 |
| 4,380,046 | 4/1983 | Fung | 395/800 |
| 4,727,474 | 2/1988 | Batcher | 395/800 |
| 4,766,534 | 8/1988 | Debenedictis | |
| 4,891,751 | 1/1990 | Call et al. | 395/800 |
| 4,910,665 | 3/1990 | Mattheyses et al. | 395/325 |
| 5,101,347 | 3/1992 | Balakrishnan et al. | 395/800 |
| 5,136,718 | 8/1992 | Haydt | 395/800 |

FOREIGN PATENT DOCUMENTS 0359177 3/1990 European Pat. Off. .
8900311 1/1989 World Int. Prop. O. .

OTHER PUBLICATIONS

Tai-Ichi et al., "A 10-ps Resolution, Process-Insensitive Timing Generator", IEEE Journal of Solid-State Circuits. vol. 24, No. 5, Oct. 1989, N.Y. pp. 1412-1418.

Primary Examiner—Partshotam S. Lall
Assistant Examiner—Krisna Lim
Attorney, Agent, or Firm—Richard A. Jordan

[57] ABSTRACT

A massively parallel processing system comprising a plurality of processing nodes controlled in parallel by a controller. The processing nodes are interconnected by a plurality of communications links. Each processing node comprises a memory, a transposer module and a router node. The memory stores data in slice format. The transposer module is connected to the memory and generates transpose data words of selected ones of the data slices from the memory. The router node is connected to the transposer module and to the communications links and transfers transpose data words over the communications links to thereby transfer the data slices between processing nodes. Finally, the controller controls the memories, transposer modules and router nodes of the processing nodes in parallel, to facilitate transfer of data slices among the processing nodes in unison.

17 Claims, 6 Drawing Sheets

MASSIVELY PARALLEL PROCESSOR INCLUDING TRANSPOSE ARRANGEMENT FOR SERIALLY TRANSMITTING BITS OF DATA WORDS STORED IN PARALLEL

INCORPORATION BY REFERENCE

U.S. Pat. No. 4,598,400, issued Jul. 1, 1986, to W. Daniel Hillis, for Method and Apparatus For Routing Message Packets, and assigned to the assignee of the present application, incorporated herein by reference.

U.S. Pat. No. 4,814,973, issued Mar. 21, 1989, to W. Daniel Hillis, for Parallel Processor, and assigned to the assignee of the present application, incorporated herein by reference.

U.S. patent application Ser. No. 07/043,126, filed Apr. 27, 1987, now U.S. Pat. No. 4,984,235, issued on Jan. 8, 1991, by W. Daniel Hillis, et al, for Method and Apparatus For Routing Message Packets, and assigned to the assignee of the present application, incorporated herein by reference.

U.S. patent application Ser. No. 07/704,688, filed May 17, 1991, now U.S. Pat. No. 5,148,547, issued on Sep. 15, 1992, which is a continuation of U.S. patent application Ser. No. 07/179,020, filed Apr. 8, 1988, now abandoned, by Brewster Kahle, et al., for Method and Apparatus For Interfacing Parallel Processors To A Co-Processor, and assigned to the assignee of the present application, incorporated herein by reference.

FIELD OF THE INVENTION

The invention relates generally to the field of massively parallel computer systems, and more particularly to communications arrangements for transferring data among processing nodes in such systems.

BACKGROUND OF THE INVENTION

A computer system generally includes one or more processors, a memory and an input/output system. The memory stores data and instructions for processing the data. The processor(s) process the data in accordance with the instructions, and store the processed data in the memory. The input/output system facilitates loading of data and instructions into the system, and obtaining processed data from the system.

Most modern computer systems have been designed around a "von Neumann" paradigm, under which each processor has a program counter that identifies the location in the memory which contains the its (the processor's) next instruction. During execution of an instruction, the processor increments the program counter to identify the location of the next instruction to be processed. Processors in such a system may share data and instructions; however, to avoid interfering with each other in an undesirable manner, such systems are typically configured so that the processors process separate instruction streams, that is, separate series of instructions, and sometimes complex procedures are provided to ensure that processors' access to the data is orderly.

In Von Neumann machines instructions in one instruction stream are used to process data in a single data stream. Such machines are typically referred to as SISD (single instruction/single data) machines if they have one processor, or MIMD (multiple instruction/multiple data) machines if they have multiple processors. In a number of types of computations, such as processing of arrays of data, the same instruction stream may be used to process data in a number of data streams. For these computations, SISD machines would iteratively perform the same operation or series of operations on the data in each data stream. Recently, single instruction/multiple data (SIMD) machines have been developed which process the data in all of the data streams in parallel. Since SIMD machine process all of the data streams in parallel, such problems can be processed much more quickly than in SISD machines, and at lower cost than with MIMD machines providing the same degree of parallelism.

The aforementioned Hillis patents and Hillis, et al., patent application disclose an SIMD machine which includes a host computer, a micro-controller and an array of processing elements, each including a bit-serial processor and a memory. The hose computer, inter alia, generates commands which are transmitted to the micro-controller. In response to a command, the micro-controller transmits one or more SIMD instructions to the array, each SIMD instruction enabling all of the processing elements to perform the same operation in connection with data stored in the elements' memories.

The array disclosed in the Hillis patents and Hillis, et al., patent application also includes two communications mechanisms which facilitate transfer of data among the processing elements. One mechanism enables each processing element to selectively transmit data to one of its four nearest-neighbor processing elements. The second mechanism, a global router interconnecting integrated circuit chips housing the processing elements in a hypercube, enables any processing element to transmit data to any other processing element in the system. In the first mechanism, termed "NEWS" (for the North, East, West, and South directions in which a processing element may transmit data, if the processing elements are considered arranged in a two-dimensional array), the micro-controller enables all of the processing elements to transmit, and to receive, bit-serial data in unison, from the selected neighbor. More recently, arrays have been developed in which "NEWS"-type mechanisms facilitate transfer of data in unison among processing elements that are considered arranged in a three-dimensional array.

On the other hand, in the global router, the data is transmitted in the form of messages, with each message containing an address that identifies the processing element to receive the data. The micro-controller enables the processing elements to transmit messages, in bit serial format, through the global router in unison, and controls the timing of the global router, but it does not control the destination of the message, as it does in the NEWS mechanism. However, the address, and other message protocol information that may be transmitted in the information, represents overhead that reduces the rate at which data can be transmitted.

As noted above, the arrays disclosed in the Hillis patents and Hillis patent application include bit-serial processors. These processors process successive bits of data serially. More recently, processor arrays have been developed which, in addition to the bit-serial processors, also include co-processors which process data, in word-parallel format. Each of the co-processors is connected to a predetermined number of the bit-serial processors to form a processing node. The aforementioned Kahle, et al, patent application describes an arrangement for connecting such coprocessors in the array.

SUMMARY OF THE INVENTION

The invention provides a new and improved communications arrangement for facilitating transfers of data among processing nodes in a processor array.

In brief summary, the invention provides a massively parallel processing system comprising a plurality of processing nodes controlled in parallel by a controller. The processing nodes are interconnected by a plurality of communications links. Each processing node comprises a memory, a transposer module and a router node. The memory stores data in slice format. The transposer module is connected to the memory and generates transpose data words of selected ones of the data slices from the memory. The router node is connected to the transposer module and to the communications links and transfers transpose data words over the communications links to thereby transfer the data slices between processing nodes. Finally, the controller controls the memories, transposer modules and router nodes of the processing nodes in parallel, to facilitate transfer of data slices among the processing nodes in unison.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 4:
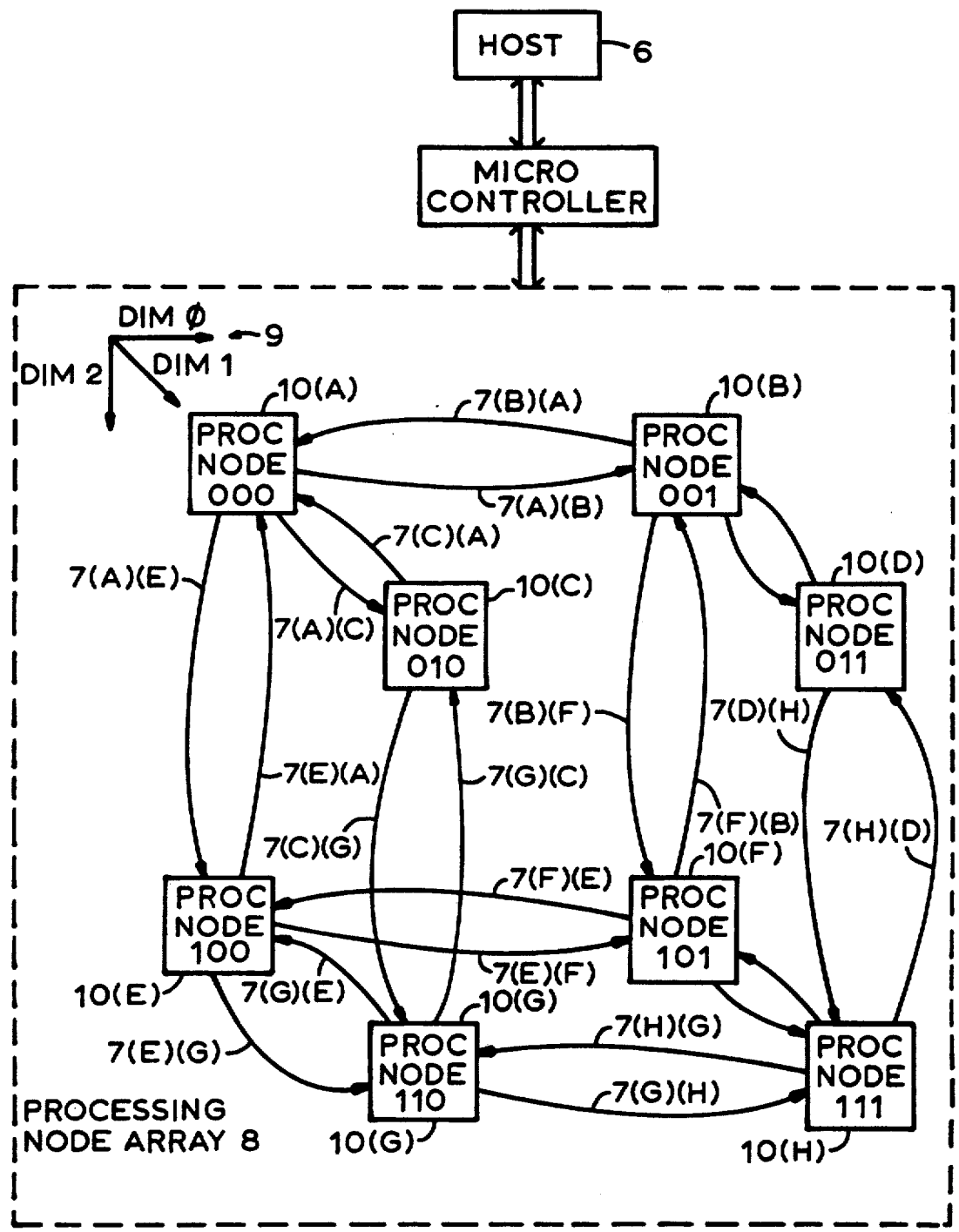
FIG. 4 is a general block diagram of a parallel processing system in which the invention can be used.

FIG. 4 is a block diagram of a portion of a computer system incorporating a communication arrangement in accordance with the invention. The computer system includes a processing node array 8 comprising a plurality of processing nodes, generally identified by reference numeral 10, interconnected by a plurality of communications links 7(x) (y). Eight processing nodes 10 are shown in the processing node array 8 depicted in FIG. 1, identified by reference numerals 10(A) through 10(H), but it will be clear from the following that the processing node array 8 may include fewer, or many more, than eight processing nodes 10. The structure of a processing node 10 will be described in detail below in connection with FIG. 1.

In one embodiment, the communications links 7(x) (y) interconnect the processing nodes 10 in the form of an "n"-dimensional hypercube. In that embodiment, each communications link 7(x) (y) transmits messages from one processing node 10(s) (hereinafter referred to as a "source" processing node) to another processing node 10(d) (hereinafter referred to as a "destination" processing node). In reference numeral 7(s) (d), the index "s" identifies the source processing node 10 and the index "d" identifies the destination processing node 10(d). As used herein, two processing nodes 10 and 10(d) will be said to be "adjacent" if there is a pair of communications links 7(s) (d) and 7(j) (i) which interconnect them.

Figure 1:
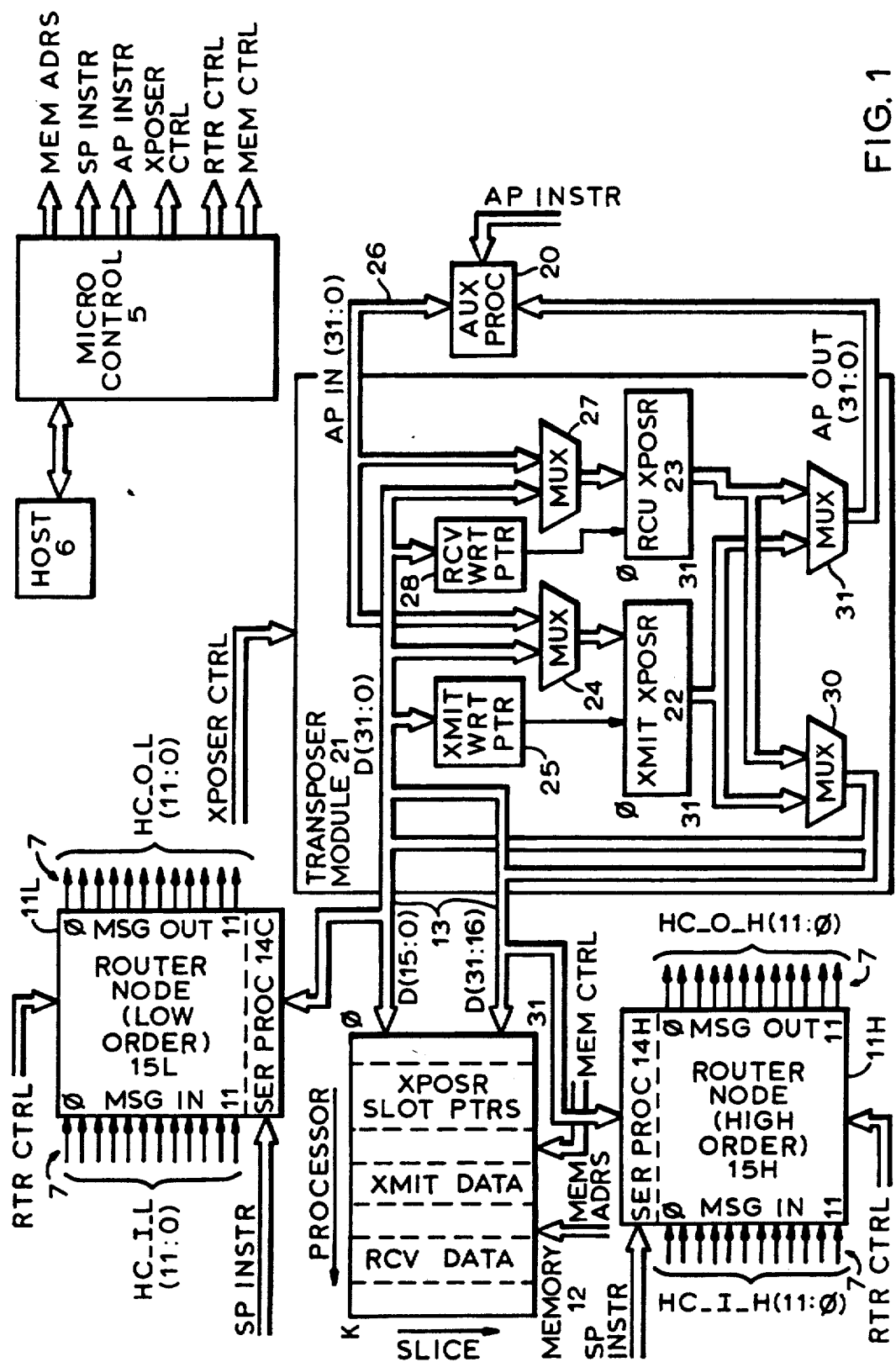
FIG. 1 is a block diagram of a portion of a computer system incorporating a communication arrangement in accordance with the invention.

In the array 8 depicted in FIG. 1, the hypercube forms three dimensions, as suggested by the grid 9 proximate processing node 10(A). As is conventional in connection with hypercubes, the dimensionality of the hypercube and the number of processing nodes are related, with the relation being that the number of dimensions corresponds to the logarithm, to the base two, of the number of processing nodes in the hypercube. Since the eight processing nodes 10 are shown in the processing node array 8 of FIG. 1, the processing nodes 10 can be interconnected in a three-dimensional hypercube. It will be appreciated that the processing node array 8 may include many more processing nodes 10 which may be interconnected by communications links 7(s) (d) to form a hypercube; preferably the number of processing nodes 10 in the array 8 is a power of two, which facilitates interconnecting them in a regular hypercube having a number of dimensions corresponding to the logarithm, to the base two, of the number of processing nodes.

The grid 13 has three arrows that are labeled "DIM 0," "DIM 1," and "DIM 2," each of which identifies one of the three dimensions DIM "i" in which "i" identifies the dimension. The directions of the hypercube dimensions, that is, the orientations of the particular communications links 7(s) (d) which correspond to the particular hypercube dimensions, differ for each processing node 10, and is determined as follows. As shown on FIG. 1, each processing node 10 is assigned a hypercube address, which is shown in binary form in FIG. 1. Each hypercube address has a number of binary digits corresponding to the number of dimensions in the hypercube. Thus, for example, processing node 10(A) is assigned hypercube address "000," processing node 10(B) is assigned hypercube address "001," and so on, with processing node 10(H) being assigned hypercube address "101." The binary addresses are assigned to the processing nodes 10 so that the binary addresses of adjacent processing nodes differ in one bit location.

In each hypercube address, the right-most binary digit is the low-order digit in the hypercube address, with each successive digit towards the left being a progressively higher order digit, and the left-most binary digit being the high-order digit in the hypercube address. The dimension of the communications link 7(s) (d) interconnecting adjacent nodes corresponds to the order of the digit in the binary addresses that is different. Thus, as shown in FIG. 1, the binary addresses of processing node 10(A) and processing node 10(B) differ in the low (zeroth) order digit, and so the hypercube dimension from processing node 10(A) to processing node 10(B) is the DIM 0 dimension zero, as shown in grid 13. Similarly, the binary addresses of processing node 10(A) and processing node 10(C) differ in the next (first) order digit, and so the hypercube dimension from processing node 10(A) to processing node 10(C) is DIM 1 dimension one, also as shown in grid 13. Finally, the binary addresses of processing node 10(A) and processing node 10(E) differ in the high (second) order digit, and so the hypercube dimension from processing node 10(A) to processing node 10(E) is DIM 2 dimension two.

The hypercube dimensions from each processing node 10 to its adjacent nodes are determined in a similar manner. It will be appreciated that, for the communications link 7(s) (d) from a processing node 10 to another processing node 10(d) that is associated with a particular dimension for the node 10, the communications link 7(j) (i) from the processing node 10(d) to the processing node 10 is associated with the same dimension. This is a result of the fact that the hypercube addresses of the processing nodes 10 and 10(d), for each pair of adjacent nodes, will differ in the same order hypercube address bit, which order determines the dimension the dimension for each processing node.

In one particular embodiment, the computer system also includes a micro-controller 5, which is controller by a host computer 6. To accomplish processing, the host computer 6, in response to a request from an applications or system program being processed thereby, transmits signals representing a command to the micro-controller 5. In response to a command, the micro-controller 5 may transmit a number of signals, as detailed below in connection with FIG. 2, to control the processing nodes 10 of processing node array 8 in parallel. The processing nodes 10 may also generate status signals, which they couple to the micro-controller 5 to notify it of the status of the operations enabled by the micro-controller. The micro-controller 5 may also provide status signals to the host computer 6 to notify it of the status of the processing of the command. In addition, the computer system may include one or more input/output systems (not shown). The input/output systems may include, for example, mass data storage devices, frame buffers, printers, or the like, which supply data to the processing node array 8 for processing, or which receive data therefrom for storage, display, and so forth.

FIG. 1 is a block diagram of a portion of a computer system incorporating a communication arrangement in accordance with the invention. The computer system includes a micro-controller 5, which is controlled by a host 6 and which, in turn, controls an array of processing nodes, one of which, namely, processing node 10, is shown in FIG. 1. To accomplish processing, the host computer 6 transmits commands to the micro-controller 5. In response to a command, the micro-controller 5 may transmit one or more instructions or other sets of control signals which control processing and other operations, in parallel, to all of the processing nodes 10 concurrently. In addition, a number of processing nodes 10 are interconnected, as described in the aforementioned Hillis patents, Hillis, et al., patent application, and Kahle, et al., patent application, to facilitate the transfer of data among the processing nodes 10.

With reference to FIG. 1, processing node 10 includes two processing element (PE) chips 11H and 11L (generally identified by reference numeral 11) connected to a memory 12 over a data bus 13. In one embodiment, the data bus includes thirty-two data lines D(31:0) which are divided into high-order data lines D(31:16), which connect to PE chip 11H, and low-order data lines D(15:0), which connect to PE chip 11L. Each PE chip 11 includes a set of serial processors, generally identified by reference numeral 14, and a router node, generally identified by reference numeral 15. The serial processors operate in response to SP INSTR serial processor instruction signals from the micro-controller 5 to perform processing on data stored in the memory 12. The memory 12 operates in response to MEM ADRS memory address signals, which identify storage locations in the memory 12, and MEM CTRL memory control signals which indicate whether data is to be stored in or transmitted from the location identified by the MEM ADRS memory address signals. Both the MEM ADRS memory address signals and the MEM CTRL memory control signals are provided by the micro-controller 5. The router nodes 15 also operate in response to RTR CTRL router control signals, also from the micro-controller 5, to transmit messages containing data from one processing node 10 to another.

In one embodiment, each PE chip 11 includes sixteen serial processors 14, each of which is associated with one of the data lines of the data bus 13. That is, each serial processor 14 receives data bits from, and transmits data bits onto, one of the data lines $D(i)$ ["i" is an integer from the set $(31, \ldots, 0)$]. The memory 12 has storage locations organized into thirty-two bit slices, with each slice being identified by a particular binary-encoded value of the MEM ADRS memory address signals from the micro-controller 5. If data is to be transmitted from a slice in memory identified by a particular value of the MEM ADRS memory address signals, the memory 12 will transmit bits 31 through 0 of the slice onto data lines D(31) through D(0), respectively. On the other hand, if data is to be loaded into a slice in memory identified by a particular value of the MEM ADRS memory address signals, the memory 12 will receive bits 31 through 0 of from data lines D(31) through D(0), respectively, and load them into respective bits of the slice.

To perform processing on multi-bit words of data in the memory 12 using the serial processors 14, the micro-controller 5 iteratively generates MEM ADRS memory address signals whose values identify successive location in memory 12, and MEM CTRL memory control signals which enable the memory 12 to transmit or store slices of data, and SP INSTR serial processor instruction signals which enable the serial processors 14 to perform the required operations on the bits on their associated data lines D(i). The data in the memory 12 thus may be viewed in two ways, namely, (i) a slice view, identified by the arrow labeled "SLICE," representing fixed-size words of data ("data slices") that will be transmitted from the memory onto the data bus 13, or that will be received by the memory from the data bus 13, at one time in response to the MEM ADRS memory address signals, and (ii) a processor view, identified by the arrow labelled "PROCESSOR," which represents the organization in memory 12 of data which may be accessed by an individual serial processor.

The router nodes 15 of all of the processing nodes are interconnected to facilitate transfer of messages among the processing nodes 10 comprising the array. Each message includes an address to identify a processing node 10 and serial processor 14 that is the intended recipient of the message, and data. In one particular embodiment the router nodes are interconnected in the form of a hypercube, as described in the aforementioned Hillis patents. Each router node 15H and 15L, under control of RTR CTRL router control signals from the micro-controller 5, transmits messages to other router nodes 15 on other processing element chips 11 over a plurality of communications links 7, more specifically identified by reference numerals HC_O_H(11:0) (connected to router node 15H) and HC_O_L(11:0) (connected to router node 15L).

In addition, each router node 15H and 15L receives messages from communications links identified by reference numerals HC_I_H(11:0) (connected to router node 15H) and HC_I_L(11:0) (connected to router 15L). The router nodes 15 determine from the address of each received message whether the message is intended for a serial processor 14 on the processing node 10 and, if so, couples it onto a data line D(i) of data bus 13 over which the serial processor 14 that is to receive the message accesses the memory 12. The micro-controller 13 generates MEM ADRS memory address and MEM CTRL memory control signals to facilitate the storage of the data from the message in the memory 12. On the other hand, if a router node 15 determines that a message is not intended for a serial processor 14 on the processing node 10, it transmits it over one of the communications links HC_O_H(11:0) and HC_O_L(11:0) as determined by the message's address.

The various communications links HC_O_H(11:0), HC_O_L(11:0), HC_I_H(11:0) and HC_I_L(11:0) connected to each processing node 10 are connected to diverse ones of other processing nodes in a conventional manner to effect the hypercube interconnection. Thus, the outgoing communications links identified by reference numerals HC_O_H(11:0) and HC_O_L(11:0) correspond to various incoming communications links, which may be identified by reference numerals HC_I_H(11:0) and HC_I_L(11:0), at router nodes 15 of other processing nodes 10. In one embodiment, the circuitry of the router nodes 15H and 15L is similar to that described in the aforementioned Hillis patents and Hillis, et al., patent application and will not be described further herein.

The processing nodes 10 may also have an auxiliary processor 20 that processes data in memory 12 that may be organized either in slice format or in processor format, and a transposer module 21 to interface the auxiliary processor 20 to the data bus 13. The auxiliary processor 20 may be, for example, a floating point processor, which may perform arithmetic and logic operations in connection with data in floating point data format. The auxiliary processors 20 and transposer modules 21 in the various processing nodes 10 operate in response to AP INSTR auxiliary processor instruction signals and XPOSER CTRL transposer control signals, respectively, from the micro-controller 5. As is the case with the other control signals provided by the micro-controller 5, the micro-controller 5 transmits the AP INSTR auxiliary processor instruction signals and the XPOSER CTRL transposer control signals to control the auxiliary processor 20 and transposer module 21 of all of the processing nodes 10 concurrently, enabling them to generally perform the same operation concurrently.

The transposer module 21 includes several transposer circuits, two of which, identified by reference numerals 22 and 23, are shown in FIG. 1. Transposer 22 receives input data from an input multiplexer 24 and stores it in one of a plurality of slots identified by the contents of a write pointer register 25. The register 25 may be provided with a pointer prior to storing each item of data in a slot in the transposer 22. Alteratively, the register may be loaded with an initial value before loading any data in the transposer 22 and then incremented for each successive item of data loaded therein. The input multiplexer 24, under control of the XPOSER CTRL transposer control signals, selectively couples data signals to the transposer 22 from either the data bus 13 or from a bus 26. Bus 26 carries AP IN (31:0) auxiliary processor in signals representing processed data from the auxiliary processor 20. The transposer module 21 also includes an input multiplexer 27 and write pointer register 28 which selectively controls storage of data in the transposer 23 in the same manner.

The transposers 22 and 23 operate in response to the XPOSER CTRL transposer control signals to generate transpositions of the data stored therein. The transposer module 21 also includes two output multiplexers 30 and 31, also controlled by the XPOSER CTRL transposer control signals, which control the transfer of transposed data onto a bus 32 for transmission to the auxiliary processor 20 or onto the data bus 13 for transmission to the memory 12 or to the PE chips 11. Multiplexer 30 receives data signals from the output terminals of transposers 22 and 23 and selectively couples the signals from one of the transposers onto the data bus 13. Similarly, the multiplexer 31 receives data signals from the output terminals of transposer 23 and selectively couples the signals from one of the transposers onto the bus 32 for transmission to the auxiliary processor.

Although not shown in FIG. 1, the processing node 10 may also provide a direct (that is, non-transposing) path between the data bus 13 and the auxiliary processor 20. It will be appreciated that the transposer module 21 facilitates the transposition of data stored in the memory 12 in processor format, which would be transmitted serially over separate lines of the data bus 13, into parallel format for processing by the auxiliary processor 20. If the data is stored in memory 12 in slice format, transposition is not required. In addition, the transposer module 21 receives processed data from the auxiliary processor 20 and, if it is required that it be stored in the memory 12 in processor format, transposes the data for transmission serially over predetermined lines of the data bus 13. If the processed data from the auxiliary processor 20 is to be stored in the memory 12 in slice format, the data may be transmitted by the auxiliary processor 20 to the memory 12 over the non-transposing path.

In accordance with the invention, the transposer module 21 is also used to provide transposed data, originally stored in the memory 12 in slice format, for transmission by the router nodes 15 of the processing elements 11, facilitating the transfer of data, in slice format, between processing nodes 10 over the various communications links interconnecting the router nodes 15. To accommodate this operation, since the micro-controller enables the processing nodes 10 to transmit and receive contemporaneously, one of the transposers, namely transposer 22, of the transposer module 21 in each processing node 10 will be designated a transmit transposer and be used for transmission, and the other transposer, namely transposer 23, will be designated a receive transposer and be used for reception.

The detailed operations by which data slices are transferred between processing nodes 10 will be described in connection with FIGS. 2A and 2B, which contain flow diagrams describing transmission and reception of the data, respectively, and FIGS. 3A and 3B, which contain diagrams illustrating the organization of the data in the transmit transposer 22 and receive transposer 23, respectively. Preliminarily, the transfer of data slices between processing nodes 10 proceeds in three general sequences. First, the micro-controller 5, in a series of iterations, enables the processing nodes 10, in unison, to transfer data slices from the memory 12 to the transmit transposer 22 (steps 101 through 103, FIG. 2A). Thereafter, the micro-controller 5 enables the processing nodes 10 to iteratively transmit, and contemporaneously to receive, the data over the communications links, and to load the received data into the receive transposers 23 (steps 104 through 106, FIG. 2A, and steps 111 through 114, FIG. 2B). Thus, while the flow diagrams depicting transmission and reception are shown in separate Figures, it should be appreciated that the micro-controller 5 will enable transmission (steps 104 through 106, FIG. 2A) and reception (steps 111 through 114, FIG. 2B) contemporaneously on an interleaved basis. During reception, a processing node 10 loads the received data in its receive transposer 23. After the receive transposers 23 have been filled, the micro-controller 5, in a series of iterations, enables the processing nodes 10 to transfer the contents of the receive transposers 23 to the respective memories 12 (steps 116 and 117, FIG. 2B).

Figure 2A:
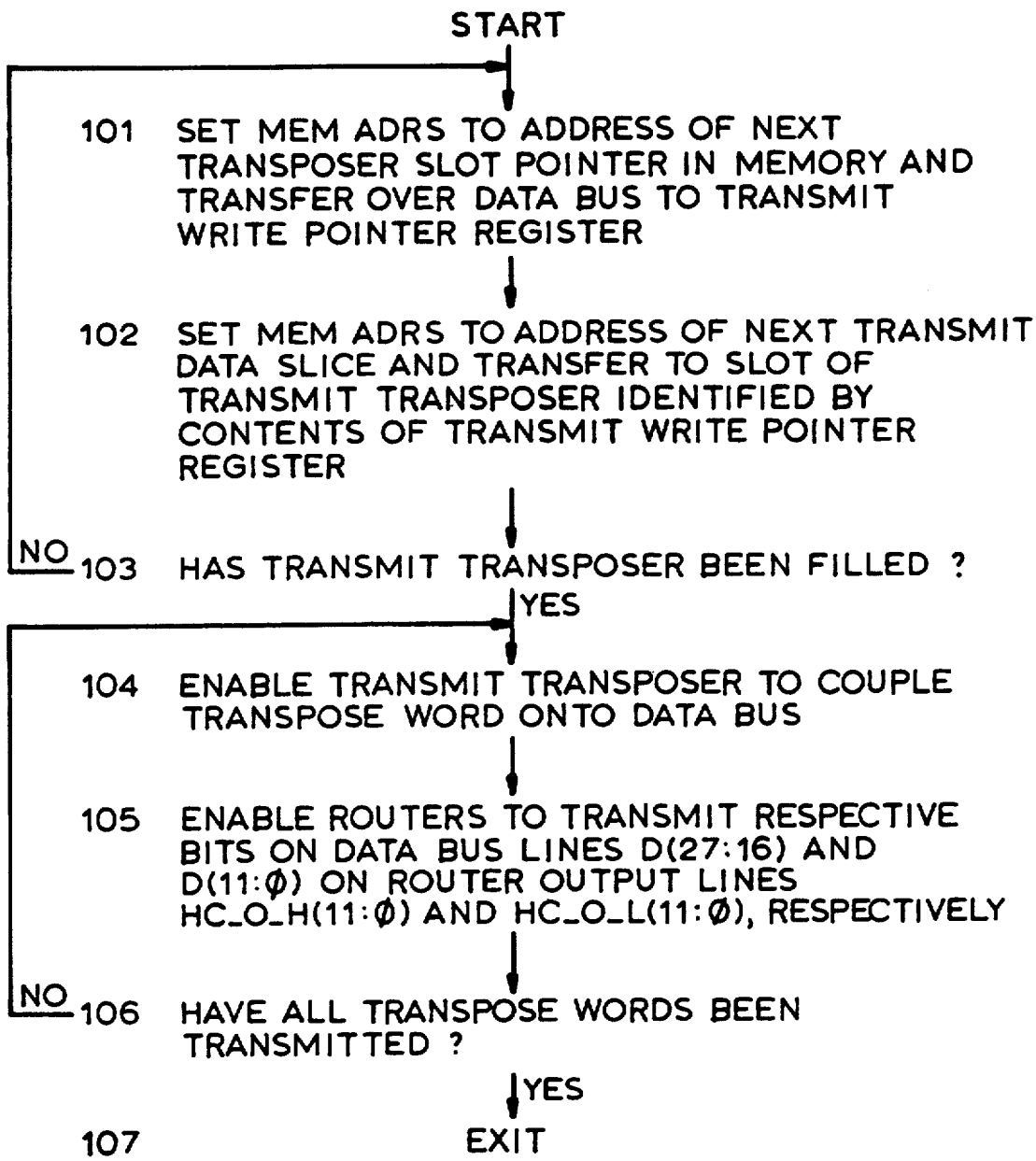
FIGS. 2A and 2B are flow diagrams useful in understanding the operation of the new communication arrangement.
Figure 3A:
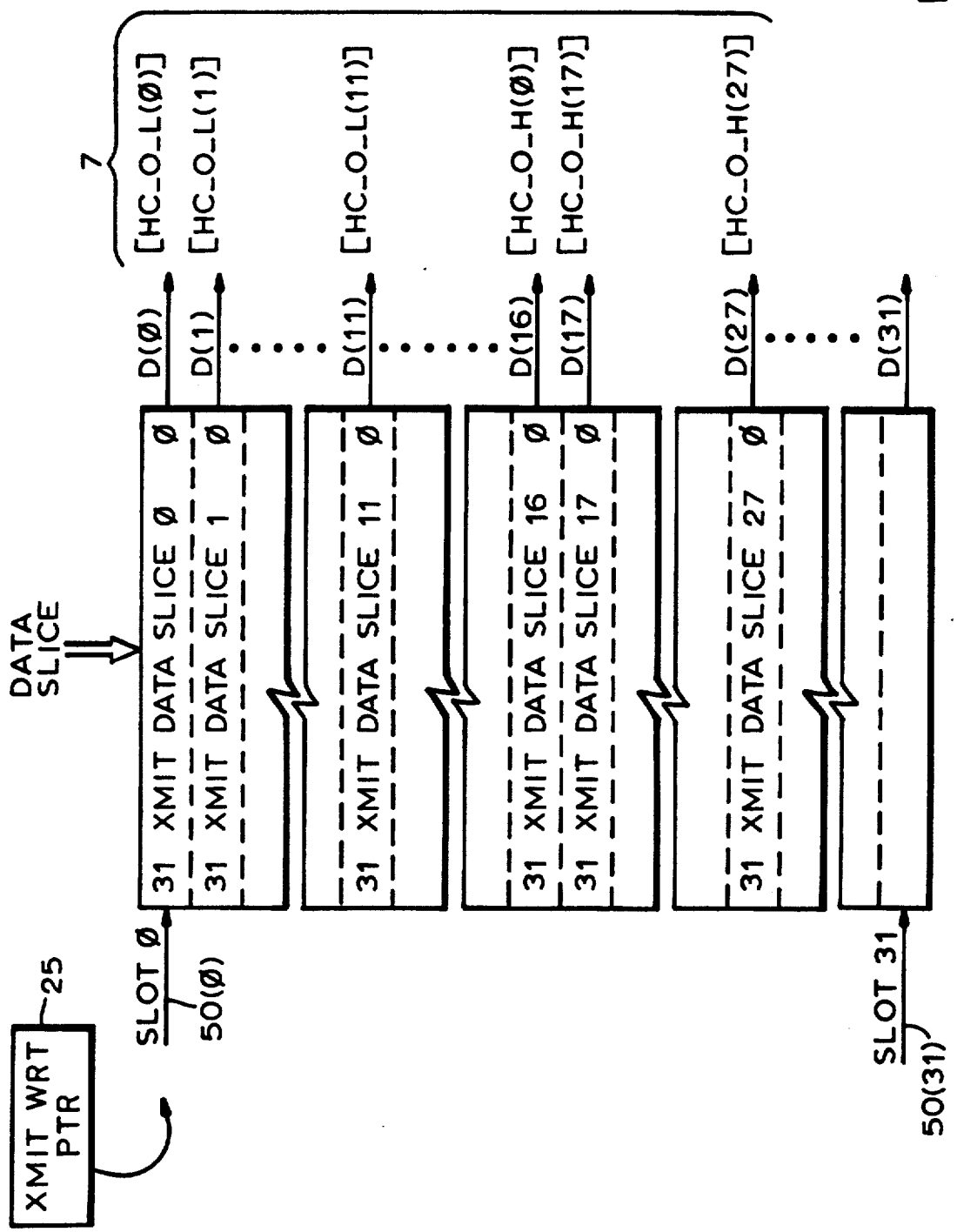
FIGS. 3A and 3B are diagrams depicting data structures useful in understanding the operation of the new communication arrangement.

More specifically, with reference to FIGS. 1 and 2A, initially the memory 12 includes a set of transposer slot pointers ("XPOSER SLOT PTRS") and the data slices to be transmitted ("XMIT DATA"). The transposer slot pointers contain, in successive slices in memory 12, pointers to locations, identified as slots, in transmit transposer 22 in which successive data slices of the memory 12 are to be stored. As will be described below in connection with FIG. 3A, the transposer slot pointers effectively select the particular data line D(i) of bus 13 over which the transmit transposer will couple each data slice, which, in turn, selects the particular communications link HC_O_H(11:0) or HC_O_L(11:0) over which each data slice will be transmitted. Since the communications links are connected to different processor nodes 10 in the array, the transposer slot pointers effectively select the processing node 10 to receive each data slice comprising the transmit data.

As noted above, the micro-controller 5 enables loading of the write transposer 22 in a series of iterations. In each iteration, the micro-controller 5 generates MEM ADRS memory address signals and XPOSER CTRL transposer control signals that, in each processing node 10, (1) enables the memory 12 to couple a transposer slot pointer onto the data bus 13 and (2) enables the transposer module 21 to load the pointer on the data bus into the write pointer register 25 (step 101). In the first iteration, during step 101 the MEM ADRS memory address signals point to the first location in memory 12 which contains a transposer slot pointer, and in successive iterations the MEM ADRS memory address signals point to successive slices in memory 12, which contain the successive transposer slot pointers.

During each iteration, after enabling a transposer slot pointer to be loaded into the write pointer register 25, the micro-controller 5 generates MEM ADRS memory address signals which point to a location in memory 12 containing a transmit data slice, and XPOSER CTRL transpose control signals that, in each processing node 10, (1) enable the memory 12 to couple a data slice onto bus 13, and (2) enable the transposer module 21 to couple the data slice on the data bus 13 through multiplexer 24 and into the slot identified by the pointer in the transmit write pointer register 25. In the first iteration, during step 101 the MEM ADRS memory address signals point to the first location in memory 12 containing transmit data, and in successive iterations the MEM ADRS memory address signals point to successive slices in memory 12.

After enabling a data slice to be loaded into the transmit transposer 22, the micro-controller determines whether the transmit transposer 22 has been filled (step 103), that is, if the transmit transposer 22 has a data slice which can be transmitted over each of the communications links HC_O_H(11:0) and HC_O_L(11:0). If not, the micro-controller returns to step 101 to begin another iteration. If the micro-controller 5 determines that the transmit transposer has been filled, it sequences to step 104 to begin transmitting the data therefrom.

Before proceeding further, it would be helpful to describe the contents of transmit transposer 22 after it has been filled. With reference to FIG. 3A, the transmit transposer includes a series of slots 50(0) through 50(31) [generally identified by reference numeral 50(i)], each of which stores one data slice transmitted thereto over data lines (31:0) comprising data bus 13. The slot 50(i) in which a data slice is stored is identified by the pointer stored in the transmit write pointer register 25. As noted above, during each iteration the pointer in register 25 is provided in step 101, prior to loading of the slot in step 102.

In one embodiment, the transmit transposer 22 is filled when it contains data slices in at most 50(0) through 50(11) and slots 50(16) through 50(27). Since each of the router nodes 15L and 15H in each PE chip 11 is connected to twelve output communications links HC_O_L(11:0) and HC_O_H(11:0), in that embodiment data slices from only twenty-four slots, such as slots 50(0) through 50(11) and 50(16) through 50(27), can be transmitted contemporaneously. In that case, the transmit transposer 22 contains a data slice to be transmitted over each of the communications links, as shown in FIG. 3A; if data slices are stored in other slots 50(i) they will not be transmitted in that embodiment.

It will be appreciated that, depending on the particular computation being performed by the computer system, the transmit transposer 22 may be deemed "filled," such that transmission can occur, if fewer than all of the slots 50(0) through 50(11) and 50(16) through 50(27) contain data slices to be transmitted. For example, in performing a "NEWS" transmission between the processing nodes 10 and their respective four or six nearest neighbors, only four or six slots 50(i) need contain data slices to be transmitted. In that case, the transposer slot pointers that are iteratively loaded into the transmit write pointer register 25 may be used to select the appropriate slots 50(i) in transmit transposer 22 so that the data slices will be transmitted to the appropriate nearest neighbor processing nodes 10.

Returning to FIG. 2A, after the micro-controller 5 determines that the transmit transposer has been filled, it initiates a series of iterations, each iteration comprising steps 104 through 106, to facilitate transmission of the data from the transmit transposer 22 over the communications links. In this operation, the micro-controller iteratively enables the transmission of sequential bits concurrently from all of the data slices stored in the transmit transposer 22. That is, during each iteration "i," the micro-controller 5 generates XPOSER CTRL transposer control signals that enable the transmit transposer 22 to couple a transmit transpose word through multiplexer 30 onto data bus lines 13 (step 104). The transmit transpose word during iteration "i" comprises the "i-th" bits in all of the slots 50 in the transmit transposer. With reference to FIG. 3A, during each iteration the data bit from slot 50(i) is transmitted onto data line D(i) of the data bus 13.

After data has been transmitted onto the data bus 13, the micro-controller 5 generates RTR CTRL router control signals that enable the router nodes 15H and 15L (FIG. 1) to transmit the bits on lines D(11:0) and D(16:27) onto the communication links HC_O_L(11:0) and HC_O_H(11:0), respectively (step 105). Thereafter, th micro-controller 5 determines whether all of the data has been transmitted from the transmit transposer 22 (step 106), and if not, it returns to step 104 to enable transmission of the next transmit transpose word. If, on the other hand, the micro-controller 5 determines in step 106 that all of the data has been transmitted from the transmit transposer, it exits the transmission sequence (step 107).

It will be appreciated that the number of iterations of steps 104 through 106 that are required to transmit the data from the transmit transposer 22 corresponds to the number of bits of data in a data slice stored in the transmit transposer 22. The maximum number of transmit transpose words that the transmit transposer 22 can provide corresponds to the maximum number of bits in a data slice to be transmitted, which is thirty-two in one embodiment. Thus, in determining whether all of the data has been transmitted from the transmit transposer (in connection with step 104) the micro-controller 5 can use an iteration counter to count iterations of steps 104 through 106, and exit when the iteration counter counts to a value corresponding to the number of bits in a data slice, or to a value corresponding to the number of bits to be transmitted if less than all bits are to be transmitted.

The sequence enabled by the micro-controller 5 in connection with reception of the transmitted data will be described in connection with FIGS. 2B and 3B. As noted above, the micro-controller 5 will enable the processing nodes 10 to transmit and receive on an interleaved basis, that is, when the micro-controller 5 enables the router nodes 15H and 15L of the processing nodes 10 to transmit bits of a transpose word onto the communications links HC_O_H(11:0) and HC_O_L(11:0) during one iteration, it also enables the processing nodes 10 to receive the bits from the communications links HC_I_H(11:0) and HC_I_L(11:0) during a contemporaneous iteration of the receive sequence. Thus, at least a portion of the receive sequence depicted on FIG. 2B will occur contemporaneous with the transmission sequence depicted on FIG. 2A.

Figure 2B:
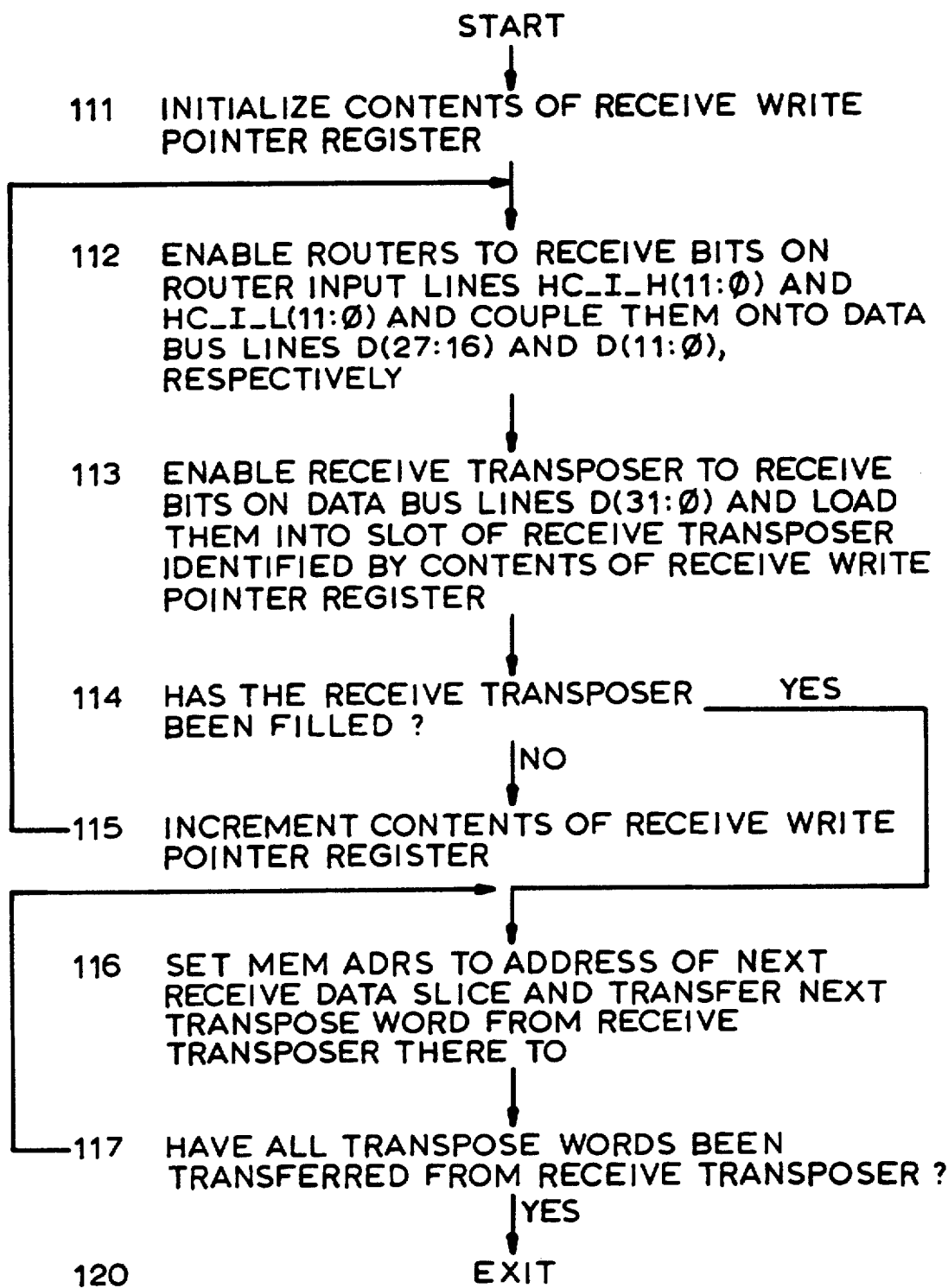

With reference to FIG. 2B, reception by the processing nodes 10 of bits from the communication links proceeds in a series of iterations, comprising steps 112 through 115, each reception iteration occurring after data bits have been coupled onto the communications links during a transmission iteration (steps 104 through 106, FIG. 2A). This allows the processing nodes 10 to receive the bits being transmitted thereto during the transmission iteration. During the successive reception iterations, the processing nodes 10 receive successive bits of the data slices from the other processing nodes connected thereto. In each iteration, each processing node 10 receive bits from corresponding bit locations in the data slices. In the successive iterations, each processing node 10 normally will store the bits in successive slots of the receive transposer 23. Thus, initially the micro-controller 5 generates XPOSER CTRL transposer control signals that enable the transposer module 21 in each processing node 10 to initialize its write pointer register 28 so as to point to the first slot of the receive transposer 23 (step 111).

After initializing the write pointer register 28 of each processing nodes 10, the micro-controller 5 initiates the sequential reception iterations, each comprising steps 112 through 115, to load received data into the receive transposer 23. During each iteration, the micro-controller 5 generates RTR CTRL router control signals that enable the router nodes 15H and 15L of the processing nodes 10 to receive the data bits then on communications links HC_I_H(11:0) and HC_I_L(11:0) respectively and to couple them onto lines D(27:16) and D(11:0) of the data bus 13 (step 112. Thereafter, the micro-controller 5 generates XPOSER CTRL transposer control signals that enable the multiplexer 27 to couple the signals on lines D(31:0) of the data bus 13 to the receive transposer 23, and the receive transposer 23 to store them in the slot in receive transposer 23 (step 113) identified by the contents of the write pointer register 28.

Figure 3B:
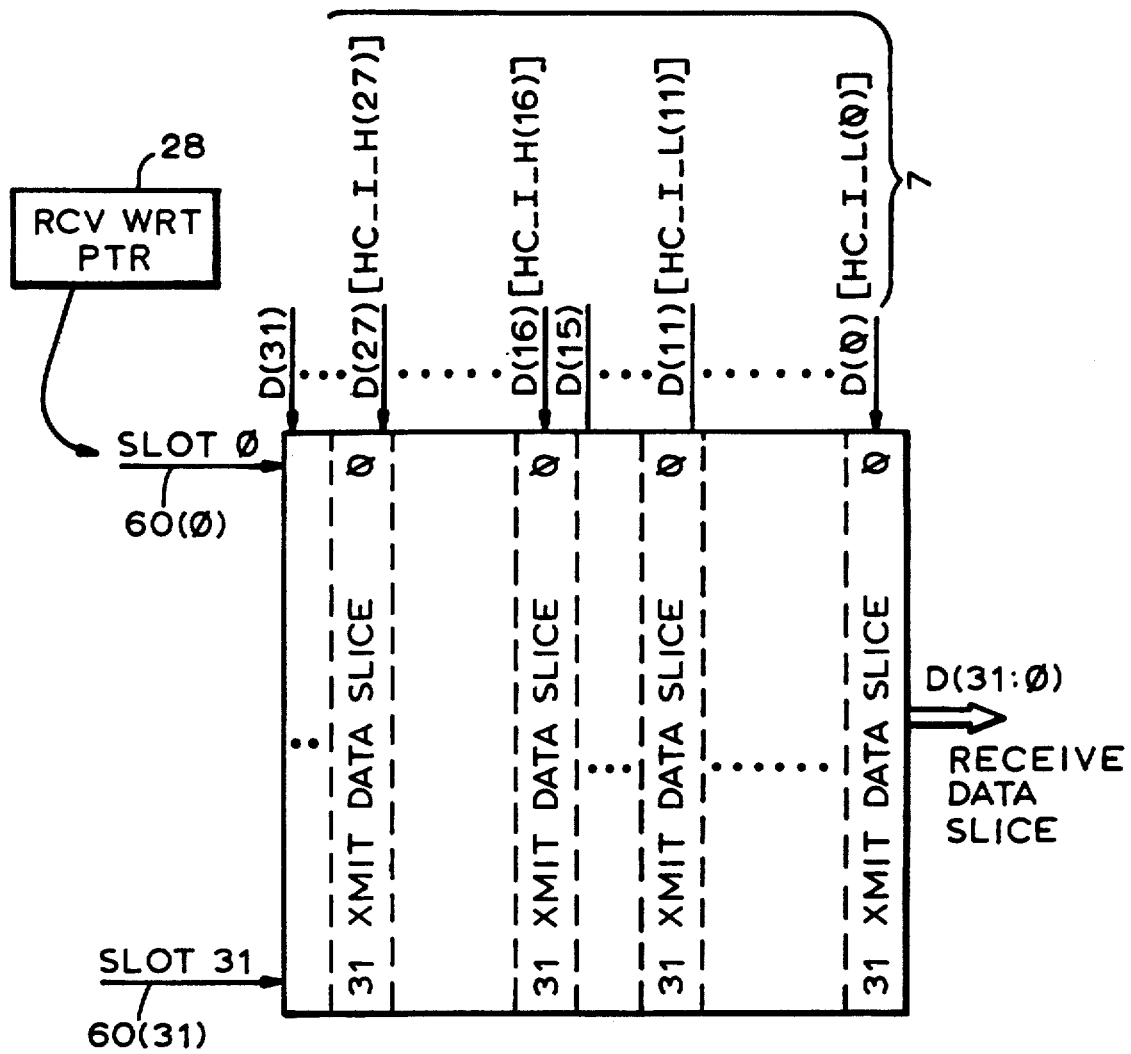

With reference to FIG. 3B, as is the case with transmit transposer 22, the receive transposer 23 includes a plurality of slots, identified as slot 60(0) through 60(31) [generally identified by reference numeral 60(i)]. Slot 60(i) in the receive transposer 23 is loaded with the data bits received during the "i-th" reception iteration. In the successive iterations, bits from each of the communications links HC_I_H(11:0) and HC_I_L(11:0) are coupled to the same bit locations in the successive slots 60. Thus, as shown in FIG. 3B, the data slices from the processing nodes 10 connected thereto are found in the same bit location in the successive slots in the receive transposer 23. It will be appreciated that each transpose word provided by the receive transposer 23 comprises the bits from the same bit locations in successive slots 60, which, as noted above, corresponds to the successive bits of a data slice transmitted to the processing node 10. Accordingly, the transpose words in the receive transposer, which, as described below, will be stored as data slices in the memory 12 of receiving processing node 10, correspond to the data slices in memory 12 of the processing nodes 10 that transmitted them thereto.

Returning to FIG. 2B, after step 113 the micro-controller 5 then determines whether the receive transposers 23 in the processing nodes 10 have been filled (step 114), and, if not, enables the processing nodes 10 to increment the receive write pointer store in their registers 28 (step 115). The receive transposer 23 will be filled if the number of reception iterations enabled by the micro-controller corresponds to the number of bits in a data slice, or a lesser number if fewer than all bits of the data slices are to be transmitted. If the micro-controller 5 determines that the receive transposers 23 have not been filled, it returns to step 112 to initiate another reception iteration.

On the other hand, if the micro-controller 5 determines, in step 111, that the number of reception iterations it has enabled during a message transfer cycle corresponds to the number of data bits in a data slice, it steps to a sequence, comprising steps 116 and 117, in which it enables the processing nodes 13 to transfer the contents of their respective receive transposers 23 to their memories 12. In this operation, the micro-controller 5 generates (i) MEM ADRS memory address signals that identify a location in the receive data region of memory 12, (ii) XPOSER CTRL transposer control signals that enable the receive transposer 23 to couple a transpose word through multiplexer 30 onto data bus 13, and (iii) MEM CTRL memory control signals to enable the data represented by the signals on data bus 13 to be stored in memory 12 (step 116). The micro-controller 5 then determines whether it has enabled storage of all of the transpose words from the receive transposer 23 in the processing nodes 10 in their respective memories 12 (step 117). If the micro-controller 5 makes a negative determination in step 117, it returns to step 116 to enable storage of the next transpose word from receive transposers 23 in respective memories 12. However, if the micro-controller 5 makes a positive determination in step 117, it exits (step 120).

It will be appreciated that the initialization (step 111) and incrementation (step 115) of the write pointer registers 28 that control storage of data in the receive transposers 23 of the respective processing nodes 10 is performed if the data bits of the slices received by the respective processing nodes are to be stored in the same order as they were transmitted. Depending on the computation being performed, it may be desirable to change the order of the bits, such as to interchange bytes (eight-bit sections) of the data slices. In that case, slot pointers similar to the transposer slot pointers used in connection with the transmit sequence (FIG. 2A) may be provided in memory 12, which may be loaded into the write pointer register 28 prior to loading of received data into the receive transposer 23, in a manner similar to step 101 of the transmit sequence (FIG. 2A). If sections or groups of bits in the received data are to be interchanged, pointers may be provided for the first locations in the receive transposers 23 in which the data bits are to be stored, which may be incremented for successive locations in the section.

The communications arrangement provides a number of advantages. First, it facilitates the transfer of data organized in slice format among the processing nodes 10, which was not the case in the systems described in the aforementioned Hillis patents and Hillis, et al., patent application. In addition, in a number of circumstances, the communications arrangement can facilitate transfer of data at a higher rate than in either the global router or the NEWS mechanism of the system described in the Hillis patents and Hillis, et al., patent application. In particular, although one embodiment uses the same wires and router node circuitry as the global router described in the Hillis patents, the arrangement can transfer data at a higher rate at least since the data being transferred does not include addressing information.

In addition, the communications arrangement described herein facilitates faster transfer than the NEWS mechanism described in the Hillis patents, since data can be transferred with all of the nearest neighbors at the same time, whereas with the NEWS mechanism data can only be transferred in one direction, with one nearest neighbor, at a time. Furthermore, while the NEWS mechanism facilitates transfers with nearest neighbors in only a two- or three-dimensional array pattern, the communication arrangement can facilitate transfer in array patterns in two, three and higher dimensions, which can be useful in a number of computations.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modification as come within the true spirit and scope of the invention.

What is claimed as new and desired to be secured by Letters Patent of the United States is:

1. A massively parallel processing system comprising:
A. a plurality of processing nodes interconnected by a plurality of communications links, each processing node comprising:
   i. a memory for storing data in the form of multi-bit memory data words, each memory data word being stored in a plurality of storage locations, each storage location having a plurality of bit locations sufficient to store a memory data word; said memory having a plurality of memory terminals which facilitate the parallel transmission and reception of data bits in a memory data word;
   ii. a router node connected to a plurality of communication links, said router node having a plurality of router node terminals each associated with one of the communications links connected to said router node, said router node receiving, in parallel through the router node terminals, data bits of a plurality of serial message data words and serially transmitting each over the associated communications link to thereby transfer the data words between processing nodes; and
   iii. a transposer module connected to the memory terminals of said memory and to the router node terminals of the router node for;
      (a) receiving in series a plurality of memory data words from said memory, the transposer module receiving bits in each memory data word in parallel, and
      (b) performing a transposition operation to transmit bits of the received memory data words in series as message data words to the router node terminals, the transposer module transmitting bits from the plurality of received memory data words to the router node terminal in parallel,
   thereby to facilitate transmission by the router node of a plurality of message data words in parallel over the communications links to other processing nodes in the massively parallel processing system, with bits of each message data word being transmitted serially over a single communications link; and
B. a controller for
   i. generating memory control commands for controlling the memories of the processing nodes, in parallel, thereby to enable them to transfer in parallel memory data words to the transposer module;
   ii. generating transposer control commands for controlling the transposer modules of the processing nodes in parallel, thereby to enable them to receive in parallel the memory data words and transmit in parallel bits to the router node terminals; and
   iii. generating router control commands for controlling the router nodes of the processing nodes in parallel, thereby to facilitate transfer over the communications links of message data words among the processing nodes in parallel.

2. A system as defined in claim 1 in which, in each processing node, the transposer module includes a plurality of multi-bit slots, the number of bits in each slot being sufficient to store the number of bits of a memory data word, and each slot being associated with one of said router node terminals, the transposer modules of said processing nodes being enabled by the controller to, respectively, (i) store memory data words from in the memory in selected ones of the slots and (ii) thereafter transmit the bits contained in each slot serially to the associated router node terminal, with the transposer being enabled to transmit data from the slots in parallel, so as to enable a plurality of data words from selected storage locations of said memory to be transmitted bit-serially over selected ones of the communication links, thereby to enable the processing nodes to transmit memory data words from selected storage locations to selected processing nodes.

3. A system as defined in claim 2 in which each processing node further includes a transposer slot pointer store for storing a series of transposer slot pointers, the transposer modules of said processing nodes being enabled by the controller to, respectively, use successive transposer slot pointers from its transposer slot pointer store to identify successive slots in which it stores memory data words successively received from said memory, thereby to determine the router node terminal and the communication link over which each memory data word will be transmitted by the router node.

4. A system as defined in claim 3 in which, in each processing node, the transposer slot pointer store comprises a series of storage locations in the processing node's memory, the processing nodes being enabled by the controller to, respectively, for successive memory data words to be transferred to the other processing nodes over the communication links in a series of iterations, successively enable the memory to transfer one of said transposer slot pointers and one of said memory data words to the transposer module, the controller further enabling the transposer module to use the transposer slot pointer it receives during each iteration to identify one of said slots into which it will load the memory data word it receives during the same iteration.

5. A system as defined in claim 1 in which
  A. for each of said processing nodes,
    i. the router node further receives serial data bits of a plurality of message data words from the communication links connected thereto and transmits them through the particular router node terminals associated therewith, the serial data bits received from each communication link comprising bits of a message data word;
    ii. the transposer module further receives in parallel the data bits from the router node terminals and performs a transposition operation so as to successively transmit memory data words received over a communication link to the memory terminals of said memory for storage therein; and
  B. the controller further controlling the memories, transposer modules and router nodes of the processing nodes in parallel, thereby to facilitate reception of memory data words by the processing nodes in parallel.

6. A system as defined in claim 5 in which, in each processing node, the transposer module includes a plurality of multi-bit slots, the number of slots being sufficient to store the number of bits of a memory data word, the bits in each slot being associated with one of said router node terminals, the transposer modules of said processing nodes being enabled by the controller to, respectively, (i) store received data bits contemporaneously received from the router node terminals in selected ones of said slots, with data bits successively received for each message data word from said router node terminals being stored in successive bits of one of said slots, and (ii) thereafter iteratively transmit the message data words in successive slots to the memory terminals in parallel so as to enable the message data words to be stored in the memory.

7. A system as defined in claim 5 in which, in each processing node, the transposer module includes a plurality of transposers, one of said transposers being identified by said controller as a transmit transposer and another of said transposers being identified by said controller as a receive transposer, the controller enabling transposer module to load the memory data words that are to be transmitted over the communications links in said transmit transposer and the message data words received from said communications links to be loaded in said receive transposer.

8. A massively parallel processing system comprising:
  A. a plurality of processing nodes interconnected by a plurality of communications links, each processing node comprising:
    i. a memory for storing data in the form of multi-bit memory data words, each memory data word being stored in a plurality of storage locations, each storage location having a plurality of bit locations sufficient to store a memory data word; said memory having a plurality of memory terminals which facilitate the parallel transmission and reception of data bits in a memory data word;
    ii. a router node connected to a plurality of communication links, said router node having a plurality of router node terminals each associated with one of the communications links connected to said router node, said router node in a data transfer operation receiving, in parallel through the router node terminals, data bits of a plurality of serial message data words and serially transmitting each over the associated communications link to thereby transfer the data words between processing nodes;
    iii. a plurality of serial processors each for processing memory data words in a serial manner during a processing operation, each serial processor having a serial processor terminal for serially receiving bits of said memory data words and performing a processing operation in connection therewith;
    iv. a transposer module connected to the memory terminals of said memory, the router node terminals of the router node and the serial processor terminal of each of said serial processors for;
      (a) receiving in series a plurality of memory data words from said memory, the transposer module receiving bits in each memory data word in parallel, and
      (b) performing a transposition operation to transmit bits of the received memory data words in series, the transposer module transmitting bits from the plurality of memory data words in parallel,
    the bits transmitted by the transposer module being selectively received by one of:
      (a) the router node terminals as message data words, thereby to facilitate transmission by the router node of a plurality of message data words in parallel over the communications links to other processing nodes in the massively parallel processing system, with bits of each message data word being transmitted serially over a single communications link, or (b) the serial processor terminals of said serial processors to serially provide bits of said memory data words to said serial processors for processing; and B. a controller for
  (i) generating memory control commands for controlling the the memories of the processing nodes in parallel, thereby to enable them to transfer in parallel memory data words to the transposer module;
  (ii) generating transposer control commands for controlling the transposer modules of the processing nodes in parallel, thereby to enable them to receive in parallel the memory data words and transmit bits from the plurality of memory data words in parallel,
  (iii) generating serial processor control commands for controlling the serial processors of the processing nodes in parallel, thereby to enable them to process in parallel; and
  (iv) generating router control commands for controlling the router nodes of the processing nodes in parallel, thereby to selectively facilitate (i) transfer over the communications links of message data words among the processing nodes in parallel and (ii) processing by said serial processors of memory data words in parallel.

9. A system as defined in claim 8 in which, in each processing node, the transposer module includes a plurality of multi-bit slots, the number of bits in each slot being sufficient to store the number of bits of a memory data word, and each slot being associated with one of said router node terminals, the transposer modules of said processing nodes being enabled by the controller to, respectively, (i) store memory data words from in the memory in selected ones of the slots and (ii) thereafter transmit the bits contained in each slot serially to the associated router node terminal, with the transposer being enabled to transmit data from the slots in parallel, so as to enable a plurality of data words from selected storage locations of said memory to be transmitted bit-serially over selected ones of the communication links, thereby to enable the processing nodes to transmit memory data words from selected storage locations to selected processing nodes.

10. A system as defined in claim 9 in which each processing node further includes a transposer slot pointer store for storing a series of transposer slot pointers, the transposer modules of said processing nodes being enabled by the controller to, respectively, use successive transposer slot pointers from its transposer slot pointer store to identify successive slots in which it stores memory data words successively received from said memory, thereby to determine the router node terminal and the communication link over which each memory data word will be transmitted by the router node.

11. A system as defined in claim 10 in which, in each processing node, the transposer slot pointer store comprises a series of storage locations in the processing node's memory, the processing nodes being enabled by the controller to, respectively, for successive memory data words to be transferred to other processing nodes over the communication links in a series of iterations, successively enable the memory to transfer one of said transposer slot pointers and one of said memory data words to the transposer module, the controller further enabling the transposer module to use the transposer slot pointer it receives during each iteration to identify one of said slots into which it will load the memory data word it receives during the same iteration.

12. A system as defined in claim 8 in which
  A. for each of said processing nodes,
    i. the router node further receives serial data bits of a plurality of message data words from the communication links connected thereto and transmits them through the particular router node terminals associated therewith, the serial data bits received from each communication link comprising bits of a message data word;
    ii. the transposer module further receives in parallel the data bits from the router node terminals and performs a transposition operation so as to successively transmit memory data words received over a communication link to the memory terminals of said memory for storage therein; and
  B. the controller further controlling the memories, transposer modules and router nodes of the processing nodes in parallel, thereby to facilitate reception of memory data words by the processing nodes in parallel.

13. A system as defined in claim 12 in which, in each processing node, the transposer module includes a plurality of multi-bit slots, the number of slots being sufficient to store the number of bits of a memory data word, the bits in each slot being associated with one of said router node terminals, the transposer modules of said processing nodes being enabled by the controller to, respectively, (i) store received data bits contemporaneously received from the router node terminals in selected ones of said slots, with data bits successively received for each message data word from said router node terminals being stored in successive bits of one of said slots, and (ii) thereafter iteratively transmit the message data words in successive slots to the memory terminals in parallel so as to enable the message data words to be stored in the memory.

14. A system as defined in claim 12 in which, in each processing node, the transposer module includes a plurality of transposers, one of said transposers being identified by said controller as a transmit transposer and another of said transposers being identified by said controller as a receive transposer, the controller enabling transposer module to load the memory data words that are to be transmitted over the communications links in said transmit transposer and the message data words received from said communications links to be loaded in said receive transposer.

15. A massively parallel processing system comprising:
  A. a plurality of processing nodes interconnected by a plurality of communications links, each processing node comprising:
    i. a memory for storing data in the form of multi-bit memory data words, each memory data word being stored in a plurality of storage locations, each storage location having a plurality of bit locations sufficient to store a memory data word; said memory having a plurality of memory terminals which facilitate the parallel transmission and reception of data bits in a memory data word;
    ii. a router node connected to a plurality of communication links, said router node having a plurality of router node terminals each associated with one of the communications links connected to said router node, said router node receiving, in parallel through the router node terminals, data bits of a plurality of serial message data words and serially transmitting each over the associated communications link to thereby transmit the data words between processing nodes, said router node further serially receiving message data words from the communications links connected thereto and transmitting them to the respective router node terminals associated with the communications links from which they were received;

iii. a transposer module comprising:
  a. a transmit transposer including a plurality of multi-bit transmit transposer slots, the number of bits in each transmit transposer slot being sufficient to store the number of bits of a memory data word, and each slot being associated with one of said router node terminals;
  b. a transmit write pointer register for storing a pointer to a transmit transposer slot in the transmit transposer in which a memory data word is to be stored;
  c. a receive transposer including a plurality of multi-bit receive transposer slots, the number of receive transposer slots being sufficient to store the number of bits of a memory data word, the bits in each receive transposer slot being associated with one of said router node terminals;
  d. a receive write pointer register for storing a pointer to a receive transposer slot in which the receive transposer is to store data bits received by said router node; and B. a controller for controlling the memories, transposer modules and router nodes of the processing nodes in parallel, thereby to facilitate transfer of memory data words among the processing nodes in unison, the controller transmitting commands to said processing nodes in parallel to
  (i) enable said memory to transmit a memory data word from each of a plurality of said storage locations for storage in ones of said transmit transposer slots as identified by said transmit write pointer register,
  (ii) in each of a plurality of successive iterations, enable:
    (a) said transmit transposer to transmit in parallel a bit of each of the memory data words stored in the transmit transposer slots to said router node terminals, and the router node to transmit the bits received from said transmit transposer as message data words over the associated communication links; and
    (b) the router node to receive in parallel bits comprising message data words from the communications links and transmit them through the associated router node terminals to the receive transposer for storage in one of said receive transposer slots identified by said receive write pointer said controller, in successive iterations, enabling said transmit transposer to transmit in parallel successive bits in parallel from the transmit transposer slots and said receive transposer to load in parallel successively-received bits into successive receive transposer slots; and
  (iii) enable said receive transposer to successively transmit corresponding bits from the receive transposer slots to the memory for storage as memory data words in selected storage locations.

16. A system as defined in claim 15 in which each processing node further includes a transposer slot pointer store for storing a series of transposer slot pointers, the transposer modules of said processing nodes being enabled by the controller to, respectively, use successive transposer slot pointers from its transposer slot pointer store to identify successive slots in which it stores memory data words successively received from said memory, thereby to determine the router node terminal and the communication link over which each memory data word will be transmitted by the router node.

17. A system as defined in claim 16 in which, in each processing node, the transposer slot pointer store comprises a series of storage locations in the processing node's memory, the processing nodes being enabled by the controller to, respectively, for successive memory data words to be transferred to other processing nodes over the communication links in a series of iterations, successively enable the memory to transfer one of said transposer slot pointers and one of said memory data words to the transposer module, the controller further enabling the transposer module to use the transposer slot pointer it receives during each iteration to identify one of said slots into which it will load the memory data word it receives during the same iteration.

* * * * *